US006410898B2

(12) United States Patent
Ducourant et al.

(10) Patent No.: US 6,410,898 B2
(45) Date of Patent: *Jun. 25, 2002

(54) PHOTOSENSITIVE DEVICE EQUIPPED WITH AN ILLUMINATION MEASUREMENT DEVICE

(75) Inventors: Thierry Ducourant, Voiron; Christophe Chaussat, St Nizier, both of (FR)

(73) Assignee: Trixell S.A.S., Moirans (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,531

(22) Filed: Nov. 24, 1998

(30) Foreign Application Priority Data

Nov. 25, 1997 (FR) .............................. 97 14763

(51) Int. Cl.[7] .............................................. H01L 27/00
(52) U.S. Cl. .............................. 250/208.1; 250/370.09; 378/108
(58) Field of Search ........................... 250/208.1, 208.2, 250/367, 370.06, 370.09; 348/302, 303, 309; 257/446, 448, 458; 378/108, 97

(56) References Cited

U.S. PATENT DOCUMENTS

| 4,948,966 A | * | 8/1990 | Arques et al. ............ 250/208.1 |
| 5,003,167 A | * | 3/1991 | Arques .................... 250/208.1 |
| 5,194,736 A | * | 3/1993 | Meulenbrugge et al. ....... 250/370.07 |
| 5,574,765 A | | 11/1996 | Hassler et al. ............. 378/98.7 |
| 5,608,775 A | * | 3/1997 | Hassler et al. ............. 378/98.8 |
| 5,751,783 A | * | 5/1998 | Granfors et al. ............ 378/108 |
| 5,777,495 A | | 7/1998 | Arques et al. ................ 327/94 |

FOREIGN PATENT DOCUMENTS

| DE | 43 00 829 | 7/1994 |
| EP | 0 364 314 | 4/1990 |

* cited by examiner

Primary Examiner—Seungsook Ham
Assistant Examiner—Thanh X. Luu
(74) Attorney, Agent, or Firm—Oblon, Spivak, McClelland, Maier & Neustadt, P.C.

(57) ABSTRACT

A photosensitive device comprises: photosensitive cells located at the intersection of at least one addressing conductor and one read conductor, a cell comprising a photosensitive diode connected to a read conductor and to at least one diode having a switching function connected to an addressing conductor, these diodes having a common point; addressing means connected to at least one addressing conductor; charge-reading means connected to at least one read conductor. The device furthermore comprises first measurement means capable of the measurement, in real time, of an information element representing a current flowing in at least one addressing conductor, this conductor being taken to an idle potential during the illumination so as to be capable of quantifying the illumination received by the cells located on the conductor concerned by the measurement; and second measurement means capable of the measurement of an information element representing a current flowing, during the illumination, in at least one read conductor, this read conductor being taken, during the illumination, to a specific potential so as to be capable of quantifying the illumination received by the cells located on the conductor concerned by the measurement. Application especially to the detection of radiological images.

20 Claims, 6 Drawing Sheets

PHOTOSENSITIVE DEVICE EQUIPPED WITH AN ILLUMINATION MEASUREMENT DEVICE

BACKGROUND OF THE INVENTION

1. Field of the Invention

The present invention pertains to photosensitive devices, particularly in the form of matrices or linear arrays of photosensitive cells made out of diodes that can produce an image from an illumination. These devices may advantageously (but not exclusively) be used for the detection of radiological images.

In this field, they are exposed to a visible radiation or a near visible radiation coming from a scintillator screen. This scintillator screen has the role of converting an X-radiation that has passed through a patient to be examined or an object to be analyzed into an illumination suited to the band of wavelengths to which the photosensitive cells are sensitive.

In order to avoid unnecessary and dangerous overexposure of the patient or object to be analyzed, it is sought to interrupt the exposure as soon as the optimum dose is reached.

2. Description of the Prior Art

In standard systems of radiological imaging, there are known ways of placing ionization chambers between the patient or the object and the radiological film in order to analyze the radiation received by the radiological film. These ionization chambers cannot be used with diode-based photosensitive devices because their shadow is superimposed on the detected image and disturbs it.

In image detectors using radiological image intensifier tubes, the radiation received is controlled directly by measurement of the photocathode current. This cannot be applied to diode-based photosensitive devices.

It has been proposed, in solid state photosensitive devices, to add optical sensors to them in order perform a measurement of the illumination that they receive. These sensors give a localized estimation of a dose at a precise point but are not adapted to the morphology of the patient being examined for example, because their position is relatively permanent and their surface area is constant.

The present invention therefore proposes a photosensitive device whose cells are constituted by diodes, this device being equipped with an illumination measurement device capable of performing a measurement on predetermined cells of the photosensitive device. This measurement device directly extracts information pertaining to the illumination in real time during the illumination.

At the end of the measurement, it is then easy to interrupt the illumination by cutting off the X-ray source when the optimum dose is reached.

The place concerned by the measurement can be easily chosen as a function of the type of examination or morphology of the patient and this choice can be made before the examination but also between two image-taking operations.

SUMMARY OF THE INVENTION

More specifically, the invention pertains to a photosensitive device comprising:

photosensitive cells located at the intersection of at least one addressing conductor and one read conductor, a cell comprising a photosensitive diode connected to a read conductor and to at least one diode having a switching function connected to an addressing conductor, these diodes having a common point, addressing means connected to at least one addressing conductor, charge-reading means connected to at least one read conductor, first measurement means capable of the measurement, during an illumination, of an information element representing a current flowing in at least one addressing conductor, this conductor being taken to an idle potential during the illumination so as to be capable of quantifying the illumination received by the cells located on the conductor concerned by the measurement, and second measurement means capable of the measurement, during the illumination, of an information element representing a current flowing in at least one read conductor, this read conductor being taken, during the illumination, to a specific potential so as to be capable of quantifying the illumination received by the cells located on the conductor concerned by the measurement.

It is possible to obtain the first measurement means with at least one integrator type measurement circuit mounted between a source delivering the idle potential and the addressing conductor.

More specifically, these first measurement means may be inserted between the source and the addressing means.

These second measurement means may comprise at least one integrator type measurement circuit connected, firstly, to a source delivering the specific potential and, secondly, to at least one read conductor and at least one switch stage inserted between the source and the read conductor.

Generally, the photosensitive source is managed by a management device that controls its different operating phases. This management device may possibly also control the first measurement means and/or the second measurement means.

In this case, the information measured by the first measurement means is transmitted to the management device by means of an analog-digital converter. Similarly, the information measured by the second measurement device is transmitted to the management device by means of an analog-digital converter.

The number of addressing conductors and/or read conductors concerned by the measurement may be computed by the management device at the end of a pre-positioning illumination operation.

The location of the conductors concerned by the measurements may be computed by the management device following a pre-positioning illumination operation.

In the same way, the number of addressing conductors and/or read conductors concerned by the measurements can be determined by the operator.

It can also be envisaged that the location of the conductors concerned by the measurements will be determined beforehand by the operator.

Generally, the addressing means comprise several addressing circuits, each connected to one or more addressing conductors and it is advantageous and simple that the first measurement means should comprise as many measurement circuits as addressing circuits. Similarly, it is possible to provide that the second measurement means will comprise as many measurement circuits as integration circuits.

According to one variant, a photosensitive cell may be located at the intersection of a read conductor and a pair of addressing conductors and comprise two switching diodes series-connected in one and the same direction of conduction, each between the common point and one of the addressing conductors of the pair. In this configuration, the first measurement meads are capable, during the illumination, of measuring the information representing the current flowing in the first addressing conductor of the pair which is held at a first idle potential and the information representing the current flowing in the second addressing conductor of the pair which is held at a second idle potential, the first and second idle potentials being distinct.

Preferably, the first idle potential is negative or zero and the second idle potential is positive.

In this configuration, the first measurement means may comprise at least one pair of measurement circuits, one being mounted between a source delivering the first idle potential and the first addressing conductor of at least one pair while the other is mounted between a source delivering the second idle potential and the second addressing conductor of the pair.

The first measurement means may be inserted between the sources delivering the first and second idle potentials and the addressing means.

In this configuration, there is provision for means to add up the information from the first measurement means with the information from the second measurement means.

The management device can carry out this addition.

BRIEF DESCRIPTION OF THE DRAWINGS

Other features and advantages of the invention shall appear from the following description made with reference to the appended figures, of which.

MORE DETAILED DESCRIPTION

Figure 1:
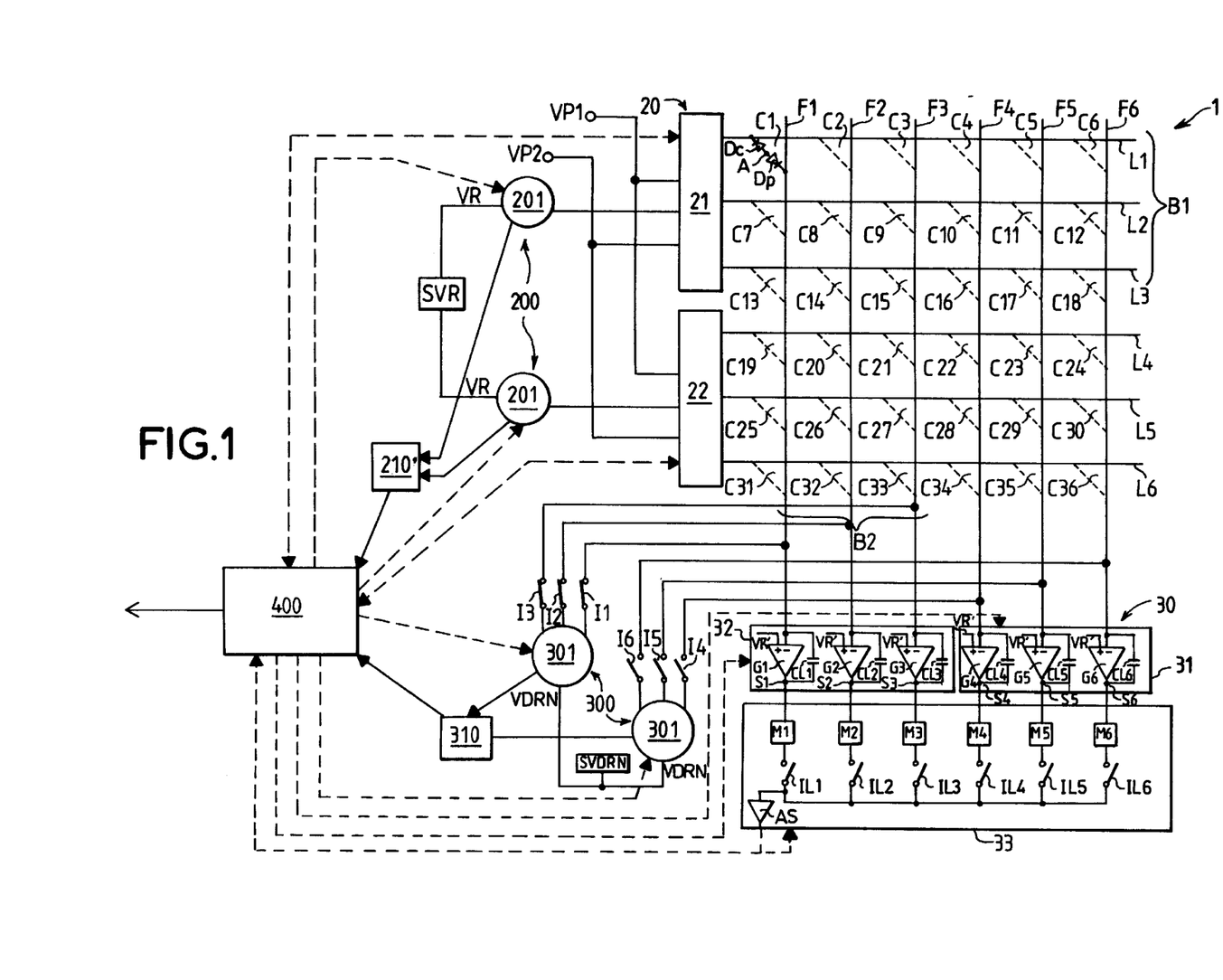
FIG. 1 shows an exemplary embodiment of a photosensitive device according to the invention in which a photosensitive cell comprises two diodes.
Figure 4:
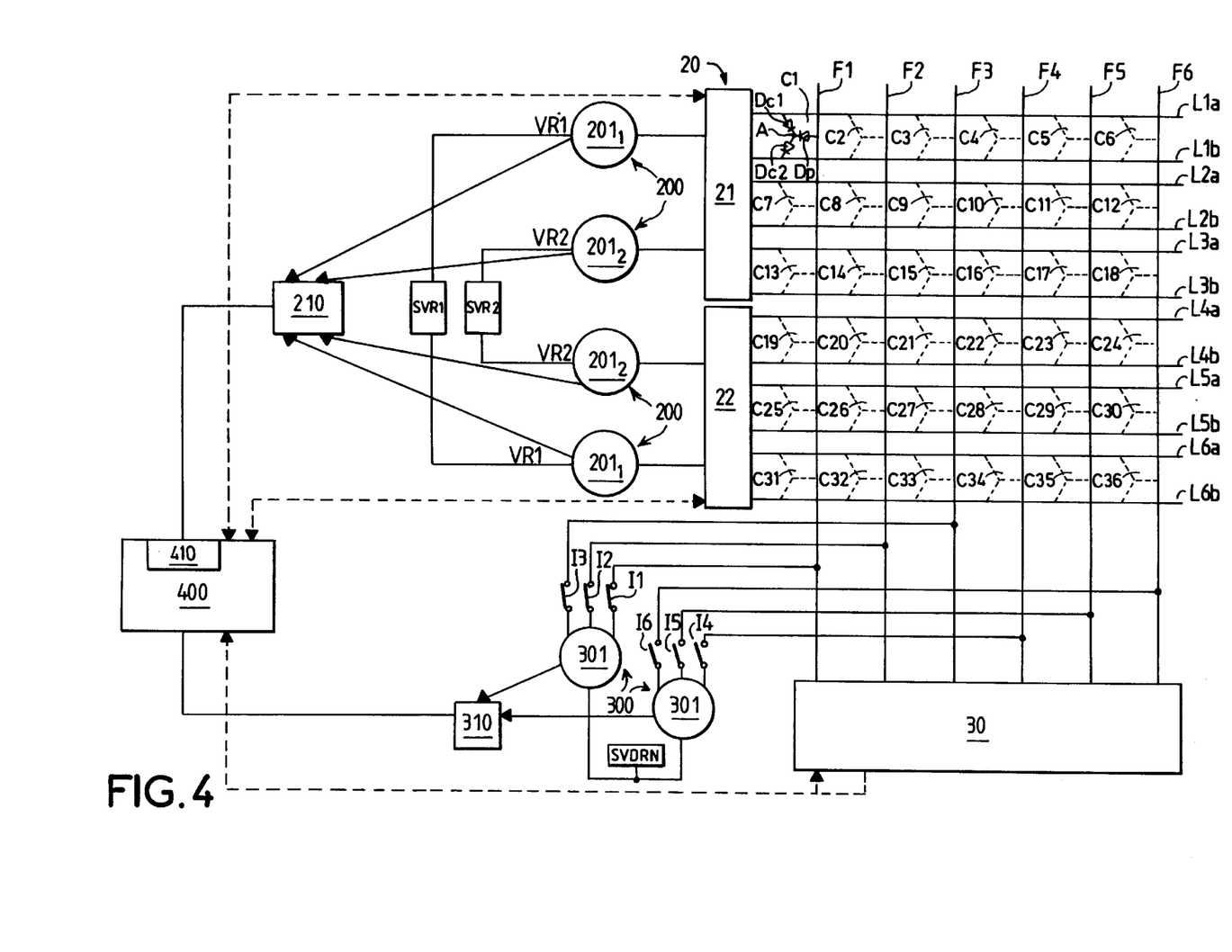
FIG. 4 shows a variant of a photosensitive device according to the invention in which a cell comprises three diodes.

In FIGS. 1 and 4, the diodes of a single cell C1 are shown clearly.

FIG. 1 gives an exemplary non-restrictive view of the diagram of a photosensitive device according to the invention. This photosensitive device has a plurality of photosensitive cells C1 to C36 arranged in this example in a matrix 1. Each cell C1 to C36 is formed by two diodes Dp, Dc one of which Dp is photosensitive while the other Dc has a switch function. These diodes are series-connected with a common point A and opposite directions of conduction. In order not to excessively burden the figure, only the diodes of the cell C1 are shown. The other cells are symbolized by dashes.

This device can be used especially to detect X-ray images. In this application, a scintillator is interposed between the photosensitive device and an object or a patient to be examined. The scintillator receives the X-rays that go through the object or the patient and converts it into light radiation which may or may not be visible in the band of wavelengths in which the photosensitive diodes are sensitive. In FIG. 1, the scintillator is not shown.

In the non-restrictive example described, the number of photosensitive cells C1 to C36 is 36, in a 6×6 assembly, but in practice this number is far greater, for example 1000× 1000.

The photosensitive matrix 1 has addressing conductors L1 to L6 and read conductors F1 to F6 that intersect and each C1 to C36 is located at the intersection of an addressing conductor and a read conductor.

In the non-restrictive example described, the switching diode Dc of a cell C1 to C36 is connected to an addressing conductor L1 to L6 by its cathode and the photosensitive diode Dp is connected, also by its cathode, to a read conductor F1 to F6.

Addressing means 20 are connected to the addressing conductors L1 to L6. They enable the sequential addressing of each of the addressing conductors L1 to L6 with a view to the reading of the photosensitive cells C1 to C36 connected to these addressing conductors. They are formed by one or more addressing circuits 21, 22, for example of the logic shift register type. FIG. 1 shows two addressing circuits 21, 22, each connected to three addressing conductors L1–L3 and L4–L6.

These addressing means 20 in particular enable the application of a pre-positioning voltage VP1 after a so-called pre-positioning illumination or practice illumination and before a useful illumination, namely a useful signal for obtaining the radiological image of the patient or object. This voltage has the form of a pulse IP obtained from an idle voltage VR. After the useful illumination, these addressing means enable the application of a read voltage VP2, also in the form of a pulse IL, from an idle voltage VR, the amplitude of the pre-positioning pulse IP being smaller than that of the read pulse IL. The idle voltage VR may be the ground. The idle voltage is delivered by a source SVR.

The addressing conductors L1 to L6 successively receive the read pulse IL while they may, at the same time or not at the same time, receive the pre-positioning pulse IP. The application of the read pulse IL, pre-positioning pulse IP and illuminations is described in the patent EP-B-0 364 314 filed on behalf of THOMSON-CSF. This pre-positioning illumination and this pre-positioning pulse enable the photosensitive device to detect very small useful illuminations.

Each read conductor F1 to F6 is connected to read means 30. These read means 30, in the example described, comprise one or more integration circuits 31, 32 and an acquisition and read circuit 33. An integration circuit 31, 32 comprises one or more operational amplifiers G1 to G6 mounted as an integrator, each by means of an integration capacitor CL1 to CL6. Each read conductor F1 to F6 is connected to the negative input "−" of an amplifier G1 to G6. Each integration capacitor CL1 to CL6 is mounted between the negative input "−" of an amplifier G1 to G6 and the output S1 to S6 of this amplifier. The second input or positive input "+" of each amplifier is connected to a reference potential VR'. This potential may be the same as the idle potential VR and therefore substantially the ground.

The outputs S1 to S6 of the amplifiers G1 to G6 are connected to the data acquisition and read circuit 33 which is a parallel input and serial output circuit. This acquisition and read circuit 33 may comprise memory elements M1 to M6, switch elements IL1 to IL6, an internal bus B and an output amplifier AS. The outputs S1 to S6 of the integrating amplifiers G1 to G6 are each connected to a memory element M1 to M6. These memory elements M1 to M6 are connected to the internal bus B through a switch element IL1 to IL6. The internal bus B supplies the output amplifier AS.

During an illumination, charges collect at the common point A of the illuminated cells. The charges that accumulate at the common point A of the cells located on one and the same addressing conductor L1 for example are transferred to the read conductors F1 to F6 when the read pulse IL is applied to this addressing conductor L1, and are integrated at the same time by the amplifiers G1 to G6 and then stored in the memory elements M1 to M6, the switches IL1 to IL6 being open. When the read pulse of these cell is over, the switches IL1 to IL6 are closed each in turn so that the information stored in the memory elements M1 to M6 is serially transmitted through the bus B to the output amplifier AS while the read amplifiers G1 to G6 achieve the parallel integration of the charges corresponding to the cells of another addressing conductor.

The addressing means 20 and read means 30 are managed by a management device 400 which inter alia controls the application of the appropriate voltages to the addressing conductors, depending on the operating phase.

Figures 2A, 2B:
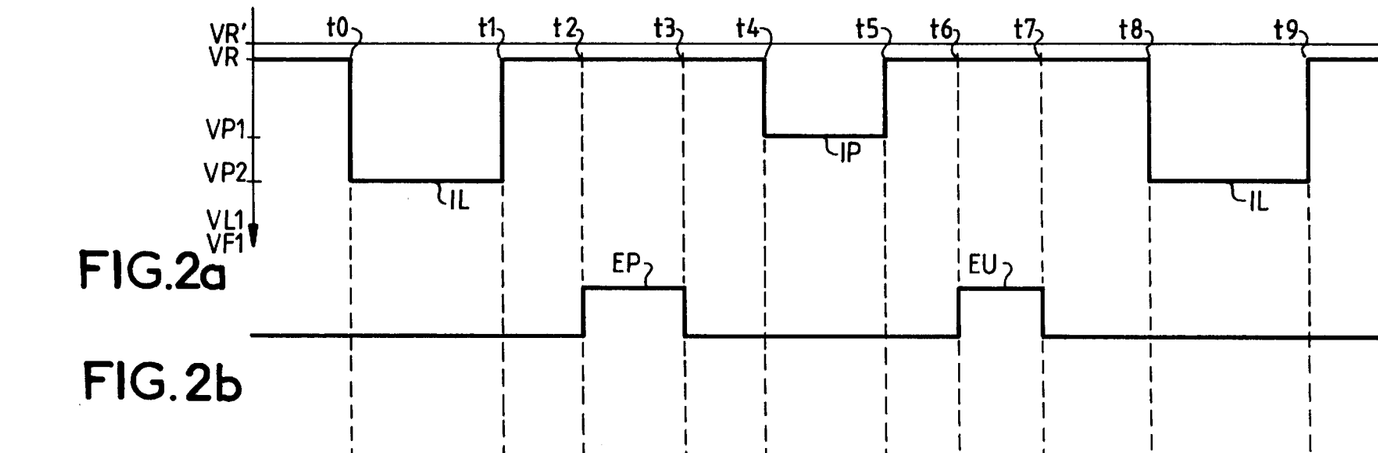
FIGS. 2a, 2b, 2c show timing diagrams representing respectively the voltages applied to the addressing conductor and the voltages applied to the read conductor of a cell of the photosensitive device of FIG. 1, the illuminations to which the cell is exposed, the variation of the voltage at the common point A between the two diodes.

FIG. 2a shows the voltage VL1 applied to the addressing conductor L1 and the voltage VF1 applied to the read conductor F1 at which there is a cell C1. These voltages are being applied in the absence of a measurement of illumination. The addressing conductor L1 receives the read pulses IL which have an amplitude VP2 which it is assumed, in this assembly, are negative as compared with the idle potential VR. If the two diodes were to be reverse-mounted, it would be positive. The voltage VF1 is constant and equal to the reference voltage VR1.

A pre-positioning pulse IP is applied, before a read pulse IL, to this addressing conductor L1. It has a same polarity as the read pulse IL but a smaller amplitude. In the absence of pulses, the addressing conductor L1 receives the idle voltage VR. A substantially constant voltage VR' is applied to the read conductor F1. This voltage VR' may be equal to the idle voltage VR.

FIG. 2b shows the pre-positioning illumination EP and the useful illumination EU received by the cell C1. The pre-positioning pulses IP and read pulses IL are applied respectively after the pre-positioning illumination EP and the useful illumination EU.

Figure 2C:
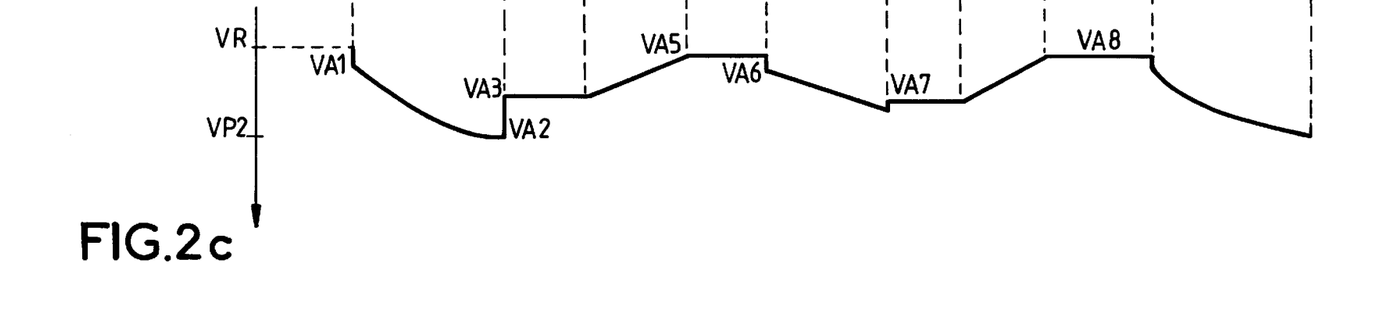

FIG. 2c shows the variations of the voltage VA at the common point A between the two diodes Dc and Dp of the cell C1.

At the instant t0, with the trailing edge of the read pulse IL, there occurs a diminishing of the voltage VA of the common point A which, if t0 is the start of the operation, goes from VR to VA1.

Between the instant t0 and the instant t1, the diode Dc is forward-biased and the voltage at A goes to VA2 and tends towards VP2 owing to the fact that the photosensitive diode Dp is reverse-biased and forms a capacitor.

At the instant t1, with the leading edge of the read pulse IL, the diode Dc goes off and goes into reverse-bias, and the voltage VA increases up to VA3.

At the instant t2, there starts a pre-positioning illumination EP which goes up to the instant t3.

Between t2 and t3, under the effect of the charges generated by the pre-positioning illumination EP, the voltage VA increases up to a value VA5 and then remains constant up to an instant t4 at which there starts a pre-positioning pulse IP with an amplitude VP1 as compared with the reference voltage VR, VP1 being smaller than VP2. This pre-positioning pulse IP enables the photoconductor diode Dc to be placed in reverse-bias and enables the charge present at the point A to be eliminated.

At the instant t4 of the start of this pre-positioning pulse IP with an amplitude VP1, the voltage VA falls up to V16. The switching diode Dc is reset in a state of direct conduction. The photodiode Dp is reverse-biased and its capacitance is charged by the switching diode Dc. After t4, the voltage VA continues to decrease and, at the instant t5 when the pre-positioning pulse IP stops, reaches a value that corresponds to the amplitude VP1 minus the value of the voltage at the flexion point of the curve of the switching diode Dc.

After the instant t5, the voltage VA is at a value VA7 which is smaller than the voltage VA5. This value VA7 is preserved until an instant t6 at which there starts a useful illumination EU which lasts until an instant t7. The voltage VA increases, prompted by the accumulation of charges at the point A.

The voltage VA then takes the value VA8 that it keeps up to an instant t8 at which there starts a second read pulse IL. Between the instant t8 and an instant t9 marking the end of the second read pulse IL, the voltage VA first of all decreases rapidly and then more slowly.

During the operation of the photosensitive device, the read conductors F1 to F6 are taken to the reference potential VR' which, in the example, is equal to the idle potential of the addressing conductors.

During the phase of useful illumination EU at the level of a cell C1, for example, owing to the non-infinite impedance of the switching diode Dc, a fraction Idose of the photocurrent Iph induced b the illumination flows, in the example shown, firstly in the read conductor F1 of the cathode of the photodiode Dp to the read means 30 and, secondly, in the addressing conductor L1 of the addressing means 20 to the cathode of the switching diode Dc. This photocurrent fraction Idose is equal to about:

$$Idose = Iph \times Z_{ph}/Z_{dc}$$

with Zdc as the impedance of the switching diode Dc, Zph as the impedance of the photodiode Dp.

This current Idose, even if it has a low value, can be measured and represents the illumination received by the cell and therefore the radiation dose X received by a patient or object in the case where the photosensitive device is used for the detection of radiological images.

However, it should not be forgotten that the ratio Zph/Zdc is a complex function that depends not only on the values of the junction capacitances of the diodes but also on the respective leakage currents of the reverse-biased diodes and that, therefore, this ratio may be made to vary as a function of parameters such as temperature, pre-positioning voltage VP1, etc.

Figure 3:
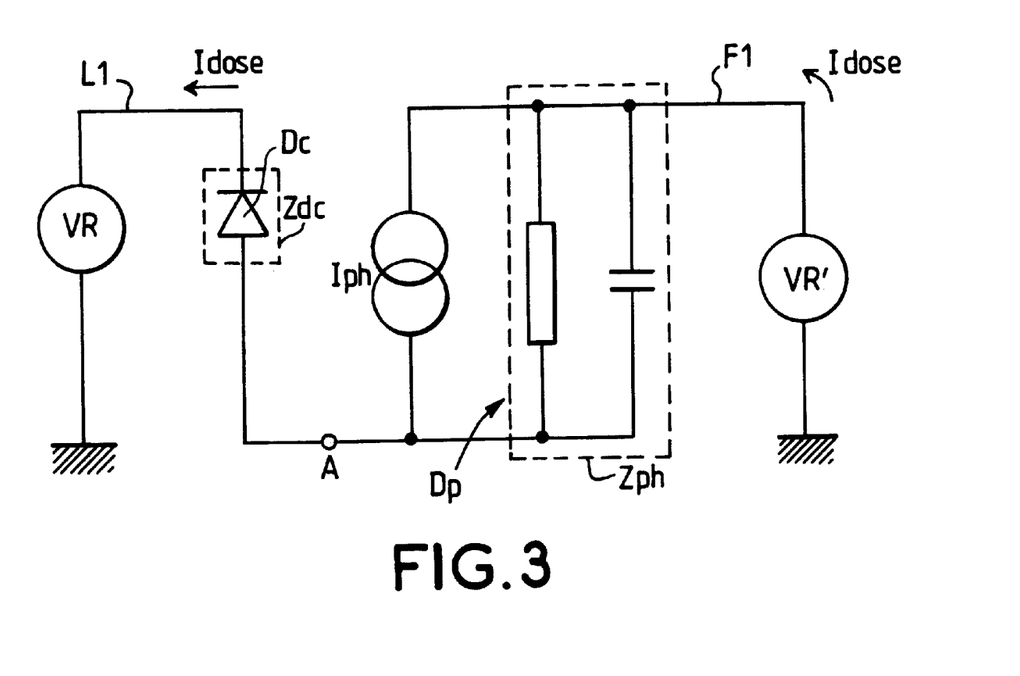
FIG. 3 shows an equivalent diagram of a cell of the device of FIG. 1 when it is illuminated.

FIG. 3 shows an electrical circuit equivalent to the cell C1 with an indication of the current Idose flowing in the addressing conductor L1 and the read conductor F1 to which the switching diode Dc and the photodiode Dp of the cell C1 are connected.

According to the invention, the photosensitive device 1 comprises first measurement means 200 associated with at least one addressing conductor L1 to L6 capable of measuring an information element representing the current flowing in the addressing conductor L1 to L6 during illumination and second measurement means 300 associated with at least one read conductor F1 to F6 capable of measuring an information element representing the current in the read conductor F1 during the illumination.

These first measurement means 200 are formed by one or more measurement circuits 201, for example of the integrator type, which actually measure the integral of the current flowing in the addressing conductor or conductors concerned during an interval of time in which an illumination occurs. Each measurement circuit 201 is connected firstly to the source SVR delivering the idle potential VR and secondly to one or more addressing conductors L1 to L6. In the example of FIG. 1, each measurement circuit 201 is connected to three addressing conductors L1–L3, L4–L6 through addressing circuits 21, 22.

The measurement is done through an illumination and, at this time, is supplied to the addressing conductor or conductors concerned by the measurement of the idle voltage VR.

In the matrices with 1000×1000 cells, there is approximately one addressing circuit for 100 addressing conductors and one integration circuit for 100 read conductors. In practice, for this size of photosensitive matrix, it is possible to provide for as many measurement circuits as there are addressing circuits. The measured information represents the sum of the currents flowing in a band B1 of addressing conductors connected to one and the same addressing circuit 21. This band B1 is shown horizontally. This information represents the illumination received by the cells located in this band B1 and therefore the dose received by the patient or object in a zone corresponding to the cells located in the band B1. The choice of the number of addressing conductors concerned by the measurement depends on the resolution that it is sought to obtain. It is of course possible to provide for fewer or more of them. The best resolution is obtained with one measurement circuit per addressing conductor. It is possible to provide for a large number of measurement circuits and use them by grouping them to obtain a spatial precision suited to the morphology of the patient and type of examination in progress.

The information collected by these first measurement means 201 can be transmitted to the management device 400 of the photosensitive device. This transmission is done through an analog-digital converter 210.

The management device 400 of the photosensitive device can then control the beginning of the first measurement means 200 when the useful illumination starts and receive, in real time, the information on the useful illumination. The number of addressing conductors on which a measurement will be made can be chosen in advance by an operator before an examination. It is also possible for the number of addressing conductors taking part in the measurement to be computed by the management device 400 during the pre-positioning illumination that corresponds for the patient or object to be analyzed to exposure to a small dose of X-rays. In the same way, the location of the conductors concerned by the measurement may be chosen by the operator or computed by the management device.

By having available a real-time estimation of the dose received by the patient in a predefined zone, the management device 400 may interrupt the exposure when the optimum dose is reached. This makes it possible to avoid unnecessary overexposure.

The read means 30 as described here above are not directly compatible with the real-time measurement of an information element representing the current flowing in each read conductor, for the reading can be done in two stages as described here above.

To arrive at this real-time measurement, the second measurement means 300 associated with at least one read conductor F1 to F6 are slightly different from the first measurement means 200. The second measurement means comprise one or more measurement circuits 301 (for example of an integrator type) and these measurement circuits 301 are, on the one hand, kept at a specific potential VDRN and, on the other hand, connected to one or more read conductors F1 to F6. A switching stage I1 to I6 is planned between the source SVDRN delivering the specific potential VDRN and the read conductors F1 to F6. The specific potential VDRN is preferably close to the ground. In practice, since the integrator amplifiers G1 to G6 are not perfect, the specific potential VDRN is slightly negative. For example it is equal to −0.5 volts. In fact, we obtain:

$$\text{VDRN}=VR'-0.5=-0.5 \text{ volts}$$

This type of amplifier recovers well when it is initialized by a more negative voltage, for example more negative by about −0.5 volts than its own idle voltage VR'.

FIG. 1 shows as many measurement circuits 301 as there are integration circuits 31, 32 and each measurement circuit 301 is connected to three read conductors F1–F3 and F4–F6 through the switch stage I1 to I6. The switch stage comprises as many switches I1 to I6 as there are read conductors F1 to F6. In another configuration, this switch stage can be located between the source SVDRN delivering the specific potential VDRN and the measurement circuits 301 and there will be as many switch elements as there are measurement circuits 301.

The second measurement means 300 are designed to start the measurement at the beginning of an illumination. As in the case of the measurement performed on the addressing conductors, the measured information may be converted into digital information in an analog-digital converter 310 and then transmitted to the management device 400 of the photosensitive device.

In FIG. 1, the measured information represents the sum of the currents flowing in a band B2 of read conductors F1 to F3 connected to one and the same integration circuit. This band B2 is vertical. During the measurement, the switch elements I1 to I3 are closed. This information represents the illumination received by the cells located in this band B2 and therefore the dose received by the patient or object in a zone corresponding to the cells located in the band B2. The management device 400 can then have real-time information available on the illumination of a band B2 formed by one or more read conductors F1 to F3 concerned by the measurement. The choice of the number of read conductors concerned by the measurement depends on the resolution to be obtained. The choice of the number and location of the read conductors concerned by the measurement may be decided before exposure by an operator, or it may be computed by the management device 400 at the end of the pre-positioning phase.

The presence of the switch elements I1, I2, I3 between a measurement circuit 301 and the read conductors F1, F2, F3 enables the measurement to be made according to choice on a single conductor or on several conductors, enabling greater flexibility in this choice of resolution.

In practice, in the same way as in the case of the addressing conductors, it is possible to use a measurement circuit 301 for all the read conductors that are connected to one and the same integration circuit 31, 32 and it may be planned to group together all the information elements coming from several measurement circuits 301 depending on the spatial precision with which it is sought to precisely identify the distribution of the dose.

In the exploitation of the measurements made, it is preferable to take account of an inevitable leakage current flowing in the addressing and read conductors that can be assessed by performing a measurement in the absence of illumination.

The principle of dose measurement that has been described can also be applied to photosensitive devices such as that of FIG. 4 whose cells C1 to C36 are formed by a photosensitive diode Dp and two diodes Dc1, Dc2 having a switching function.

With this structure, a photosensitive cell C1 to C36 is located at the intersection of a read conductor F1 to F6 and a pair of addressing conductors L1a, L1b to L6a, L6b.

The two diodes Dc1, Dc2 with the switching function are series-connected with one and the same direction of conduction.

In FIG. 4, the anode of the first diode Dc1 is connected to the first addressing conductor L1a of the pair. Its cathode is connected to the anode of the second diode Dc2 forming the common point A. The cathode of the second diode Dc2 is connected to the second conductor L1b of the pair.

The photosensitive diode Dp has its cathode connected to the common point A between the two diodes Dc1, Dc2 and its anode connected to a read conductor F1. In FIG. 4, only the diodes of the cell C1 are shown.

Figure 5A:
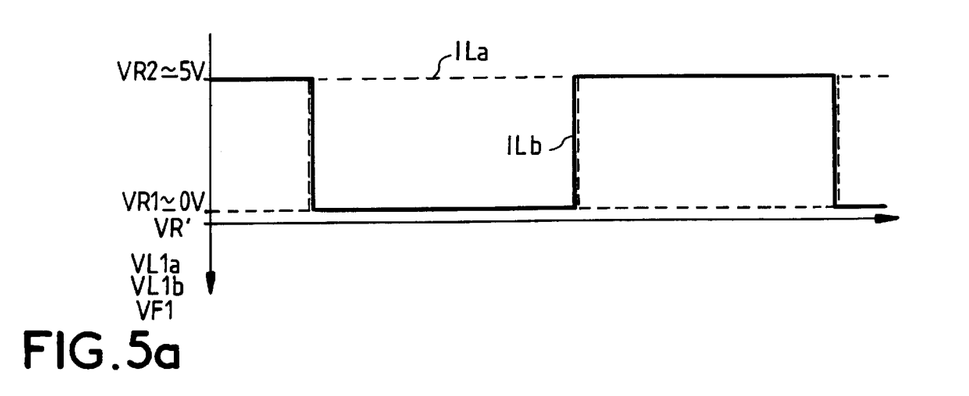
FIGS. 5a, 5b, 5c are timing diagrams respectively showing the voltages applied to the elementary addressing conductors and to the read conductor of a cell of the photosensitive device of FIG. 4, the illuminations to which a cell is exposed and the variations of the voltage at the common point A.
Figure 5B:
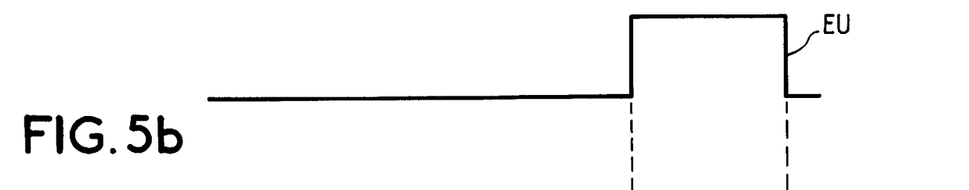
Figure 5C:
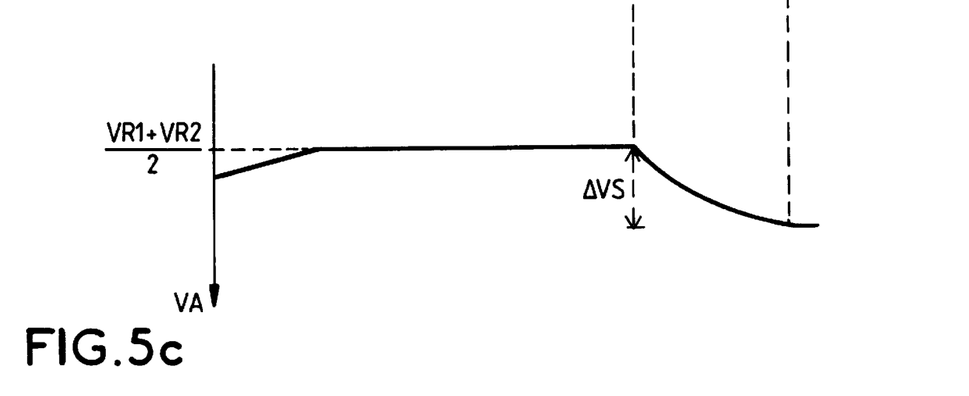

In this type of structure, the read pulses ILa, ILb applied to a pair of addressing conductors L1a, L1b are in phase opposition. FIG. 5a, like FIG. 2a, shows the voltages applied to the pair of addressing conductors L1a, L1b and to the read conductor F1 of the cell C1. FIG. 5b shows the illumination that it receives and FIG. 5c shows the variation of the potential VA at the common point A.

The first read pulse L1a (shown in dashes) applied to the first addressing conductor L1a of the pair passes from a first idle potential VR1 to a first activation potential VR2 before going back to the first idle potential VR1 while the second read pulse L1b (shown in solid lines), applied to the second addressing conductor L1b in synchronism with the first pulse ILa, goes from a second idle potential to a second activation potential before returning to the second idle potential. In this structure, the second activation potential is equal to the first idle potential VR1 and the second idle potential is equal to the first activation potential VR2.

The first and second idle potentials VR1, VR2 are distinct. Preferably, the first idle potential VR1 is substantially zero or negative while the second idle potential VR2 is positive. In the example shown, the first idle potential VR1 is about 0 V and the second idle potential VR2 is about +5 V.

During the application of these read pulses ILa, ILb, the diodes Dc1, Dc2 having a switching function are in forward bias and each of these diodes, at its terminals, at the end of a transition period corresponding generally to the leading and trailing edges of the read pulses, perceives a potential difference of about 2.5 V. In a conventional way, the read conductors F1 to F6 receive a reference voltage VR' which may be equal to or close to the first idle potential VR1. During the application of the read pulses ILa, ILb, the diode Dp is reverse-biased. The voltage VA at the common point A is substantially constant and equal to (VR1+VR2)/2. At the end of the read pulses ILa, ILb, the diodes Dc1, Dc2 having a switching function are reverse-biased just like the photodiode Dp. The illumination phase can begin. The illumination EU creates a drop in voltage ΔVS of the voltage VA at the common point A and this drop in voltage is related to the accumulation of charges at the common point A under the effect of the illumination.

The advantage of this type of assembly is that it makes it possible to eliminate the pre-positioning illumination for it prevents the switching diodes from falling to very low biasing levels for which their currents and impedance levels are too low. This is known to induce incomplete read operations.

By contrast, the drawbacks of this type of assembly lie in the complexity of the designing of each cell, a small optical aperture, greater difficulty in connections, greater complexity in the addressing circuits and in the measurement circuits associated with the addressing circuits.

Now, the fraction of photocurrent flowing in the addressing and read conductors of a cell C1 during the illumination is:

$$Idose \approx (Iph \times Zph)/(Zdc1/Zdc2)$$

with Zdc1 as the impedance of the first switching diode Dc1 in reverse bias, Zdc2 as the impedance of the second switching diode Dc2 in reverse bias, Zph as the impedance of the photosensitive diode and Iph as the photocurrent induced by the illumination.

Figure 6:
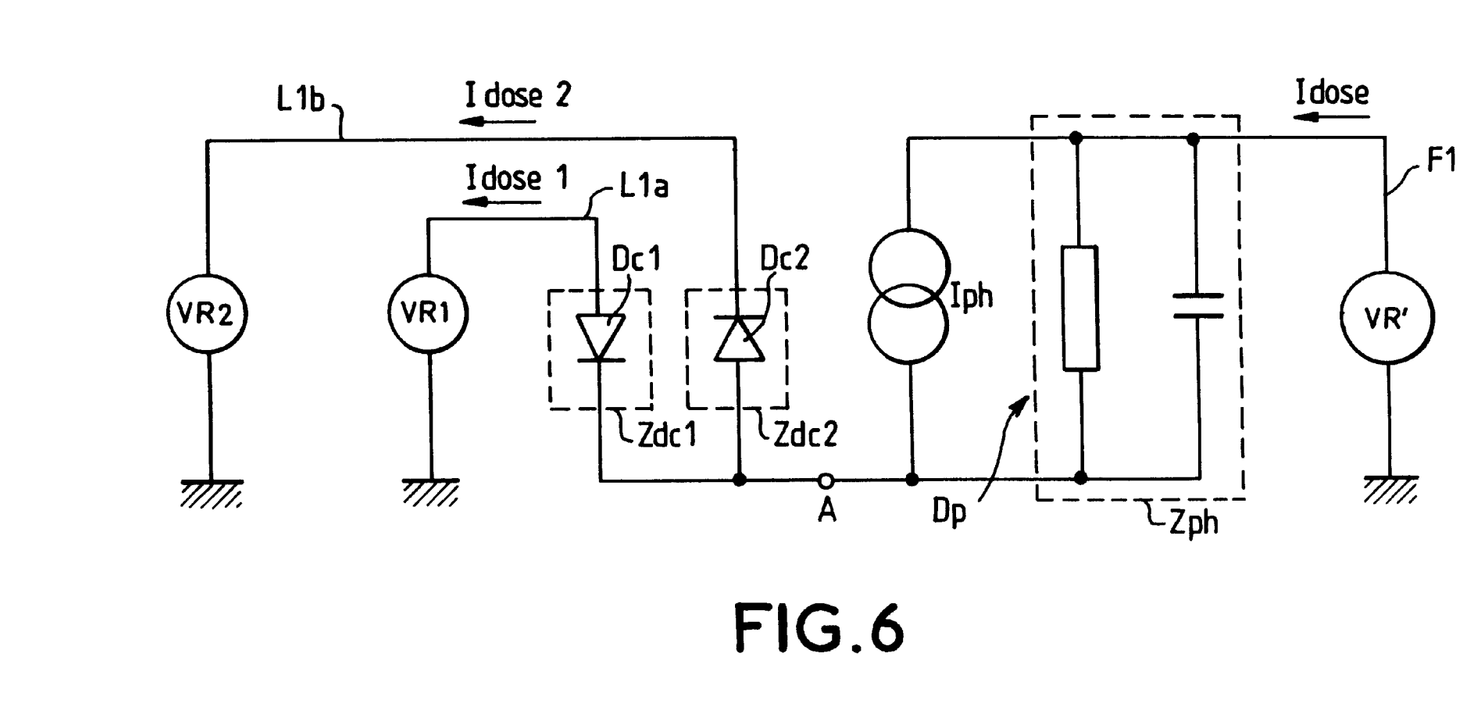
FIG. 6 shows an equivalent diagram of a cell of the device of FIG. 4 when it is illuminated.

The fraction of the photocurrent Idose that appears at the level of a cell C1, during an illumination, flows in the read conductor F1. On the addressing conductors side, it is distributed in the two elementary addressing conductors L1a, L1b on which the cell C1 is located. FIG. 6 mentions a current Idose1 flowing in the conductor L1a and a current Idose2 flowing in the conductor L1b with:

$$Idose = Idose1 + Idose2$$

At the level of the read means 30 and the second measurement means 300 for measuring the information representing the current flowing in at least one read conductor, there is no change as compared with what was described in the structure shown in FIG. 1.

At the level of the first measurement means 200, there are a few modifications with respect to what was shown in FIG. 1. The first measurement means 200 are designed for the measurement, during the illumination, of the information representing the current flowing in the first addressing conductor L1a of the pair which is maintained at a first idle potential VR1 and the information representing the current flowing in the second addressing conductor L1b of the pair which is maintained at a second idle potential VR2.

The first measurement means 200 now comprise at least one pair of measurement circuits $201_1$, $201_2$. The first pair $201_1$ is mounted between a source SVR1 delivering the first idle potential VR1 and the first addressing conductor L1a of at least one pair, the second pair $201_2$ is mounted between a source SVR2 delivering the second idle potential VR2 and the second addressing conductor L1b of the pair.

More specifically, the first measurement circuit $201_1$ is inserted between the source SVR1 delivering the first idle potential and the addressing means 20 while the second measurement circuit $201_2$ is inserted between the source SVR2 delivering the second idle potential VR2 and the addressing means 20.

Means 410 are provided for adding up the information measured by the two measurement circuits $201_1$, $201_2$ to obtain knowledge of the illumination received by the cells located on a pair of addressing conductors L1a, L1b. These means can be integrated into the management device 400. As in FIG. 1, the analog-digital converter 210 can be seen The addressing conductors L1a, L1b, ..., L6a, L6b no longer receive any other than the voltages VR1, VR2 depending on the operating phase in which the system is placed.

What is claimed is:

1. A photosensitive device comprising:
    addressing conductors;
    read conductors;
    a plurality of photosensitive cells arranged as a matrix, wherein the addressing conductors and the read conductors intersect between the cells of the matrix, each cell is connected to one of the addressing conductors and to one of the read conductors, and each cell includes:
        a photosensitive diode connected to the one read conductor, and configured to generate a current in response to an illumination, and
        a switching diode connected to the one addressing conductor, and configured to allow a fraction of the generated current to flow to the one read conductor and to the one addressing conductor, wherein the photosensitive diode and the switching diode share a common point;
    addressing circuit directly connected to the addressing conductors;
    charge-reading means connected to the read conductors for reading charges that accumulated in selected cells during the illumination;
    first measuring means for measuring during the illumination an information element representative of a sum of the current flowing in the addressing conductors, wherein the addressing conductors include a pre-selected subset of addressing conductors, the addressing conductors of said subset being held to an in idle potential during the illumination in order to quantify the amount of illumination received by cells connected to the subset of addressing conductors so as to extract information pertaining to the illumination in real time; and
    second means for measuring during the illumination an information element representative of a sum of the current flowing in the read conductors, wherein the read conductors include a pre-selected subset of read conductors, the read conductors of said subset being held to a predetermined potential during the illumination in order to quantify the amount of illumination received by cells connected to the subset of read conductors so as to extract information pertaining to the illumination in real time.

2. A photosensitive device according to claim 1, wherein the first measurement means comprise at least one integrator type measurement circuit mounted between a source delivering the idle potential and the addressing conductor.

3. A photosensitive device according to claim 2, wherein the first measurement means are inserted between the source and the addressing means.

4. A photosensitive device according to claim 1, wherein the second measurement means comprise at least one integrator measurement circuit connected, firstly, to a source delivering the predetermined potential and, secondly, to at least one read conductor and at least one switch stage inserted between the source and the read conductor connected to the at least one integrator measurement circuit.

5. A photosensitive device according to claim 1, wherein at least one of the first measurement means and the second measurement means are managed by a management device.

6. A photosensitive device according to claim 5, wherein the information element measured by the first measurement means is transmitted to the management device by means of an analog-digital converter.

7. A photosensitive device according to claim 5, wherein the information element measured by the second measurement means is transmitted to the management device by means of an analog-digital converter.

8. A photosensitive device according to claim 1, wherein the addressing means comprise several addressing circuits, each addressing circuit is connected to one or more addressing conductors, and the first measurement means comprise as many measurement circuits as addressing circuits.

9. A photosensitive device according to claim 1, wherein the reading means comprise several integration circuits, each integration circuit is connected to one or more read conductors, and the second measurement means comprise as many measurement circuits as integration circuits.

10. A photosensitive device according to claim 1, wherein:
    a photosensitive cell is located at the intersection between a read conductor and a pair of the addressing conductors, and comprises two switching diodes series-connected in one and the same direction of conduction;
    each switching diode is connected between the common point and one of the addressing conductors of the pair;
    the first measurement means measures during the illumination the information element representing the current flowing in the first addressing conductor of the pair which is held at a first value of the idle potential and the information representing the current flowing in the second addressing conductor of the pair which is held at a second value of the idle potential; and
    the first and second values are distinct.

11. A photosensitive device according to claim 10, wherein the first value is negative or zero and the second value is positive.

12. A photosensitive device according to claim 10, wherein the first measurement means comprise at least one pair of measurement circuits, one measurement circuit is mounted between a source delivering the first value of the idle potential and a first addressing conductor of the pair of addressing circuits, and the other measurement circuit is mounted between a source delivering the second value of the idle potential and the second addressing conductor of the pair.

13. A photosensitive device according to claim 12, wherein the first measurement means are inserted between the sources delivering the first and second idle potentials and the addressing means.

14. A photosensitive device according to claim 11, further comprising means for adding,
    wherein said first measurement means comprises first and second measurement circuits, and
    the means for adding adds up the information from the first measurement circuit and the information from the second measurement circuit.

15. A photosensitive device according to claim 14, wherein the management device carries out the addition.

16. A photosensitive device according to claim 1, wherein a location of the subset of conductors is determined by an operator.

17. A photosensitive device according to claim 1, wherein at least one of a number of addressing conductors included in the subset of addressing conductors and a number of read conductors included in the subset of read conductors is determined by an operator.

18. A photosensitive device according to claim 5, wherein at least one of a number of addressing conductors included in the subset of addressing conductors and a number of read conductors included in the subset of read conductors is computed by the management device following a pre-positioning illumination.

19. A photosensitive device according to claim 5, wherein at least one of a location of the subset of addressing conductors and a location of the subset of read conductors is computed by the management device following a pre-positioning illumination.

20. A photosensitive device comprising:

addressing conductors;

read conductors;

a plurality of photosensitive cells arranged as a matrix, wherein the addressing conductors and the read conductors intersect between the cells of the matrix, each cell is connected to one of the addressing conductors and to one of the read conductors, and each cell includes:
  a photosensitive diode connected to the one read conductor, and configured to generate a current in response to an illumination, and
  a switching diode connected to the one addressing conductor, and configured to allow a fraction of the generated current to flow to the one read conductor and to the one addressing conductor, wherein the photosensitive diode and the switching diode share a common point;

an addressing circuit directly connected to the addressing conductors;

a charge-reading circuit connected to the read conductors and configured to read charges that accumulated in selected cells during the illumination;

a first measuring circuit configured to measure during the illumination an information element representative of a sum of the current flowing in the addressing conductors, wherein the addressing conductors include a pre-selected subset of addressing conductors, the addressing conductors of said subset being held to an in idle potential during the illumination in order to quantify the amount of illumination received by cells connected to the subset of addressing conductors so as to extract information pertaining to the illumination in real time; and a second measuring circuit configured to measure during the illumination an information element representative of a sum of the current flowing in the read conductors, wherein the read conductors include a pre-selected subset of read conductors, the read conductors of said subset being held to a predetermined potential during the illumination in order to quantify the amount of illumination received by cells connected to the subset of read conductors so as to extract information pertaining to the illumination in real time.

* * * * *